United States Patent [19]

Lile

[11] 4,009,853
[45] Mar. 1, 1977

[54] SINGLE SHOVEL HOLDER

[76] Inventor: William H. Lile, 771-6 N. Fairoaks, Sunnyvale, Calif. 94086

[22] Filed: Mar. 1, 1976

[21] Appl. No.: 662,436

[52] U.S. Cl. .............................. 248/201; 248/203; 211/60 T; 211/63; 70/61

[51] Int. Cl.² ..................... A47B 96/06; A47F 7/00

[58] Field of Search ............... 248/201, 203; 211/4, 211/60 T, 60 A, 60 SK, 63, 64; 224/29 R, 35, 29 K, 42.25; 70/61

[56] References Cited

UNITED STATES PATENTS

| 2,384,850 | 9/1945 | Poor | 211/60 SK |
|---|---|---|---|
| 3,081,056 | 3/1963 | Young et al. | 70/61 |
| 3,105,666 | 10/1963 | Orr | 248/203 |
| 3,156,388 | 11/1964 | Simmons | 211/60 T |
| 3,273,769 | 9/1966 | Miller | 211/63 |
| 3,432,133 | 3/1969 | Schmid | 248/201 |
| 3,648,908 | 3/1972 | Thompson | 224/35 |
| 3,893,568 | 7/1975 | Lile | 248/203 |

FOREIGN PATENTS OR APPLICATIONS

| 221,683 | 5/1910 | Germany | 211/63 |
|---|---|---|---|
| 117,131 | 9/1925 | Switzerland | 211/63 |

Primary Examiner—Robert A. Hafer
Attorney, Agent, or Firm—C. Michael Zimmerman

[57] ABSTRACT

A holder is described designed to securely mount a hand shovel on various different kinds of equipment. The holder includes a pair of channel iron brackets mountable at spaced locations on the equipment. A first one of the brackets includes a slot for receiving the handle of the shovel adjacent its scoop, a pair of apertures on opposite sides of such slot for receiving a padlock or the like to close the open end of such slot, and a tongue extending angularly upward from the bottom of the slot to prevent removal of the shovel from the slot by passing the shovel handle longitudinally through the slot. The second channel iron bracket has an opening for receiving the free end of the shovel handle and maintaining it in place. A neoprene gasket circumscribes the opening to prevent the handle from contacting the metal edge of the opening and being damaged.

6 Claims, 4 Drawing Figures

U.S. Patent  Mar. 1, 1977  4,009,853
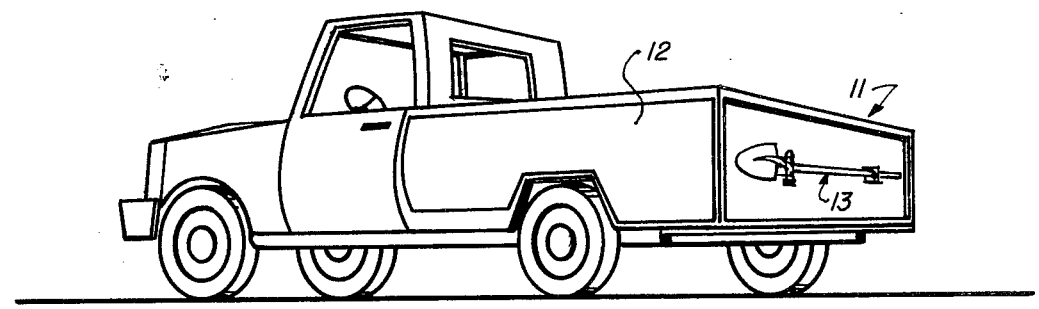
FIG. 1
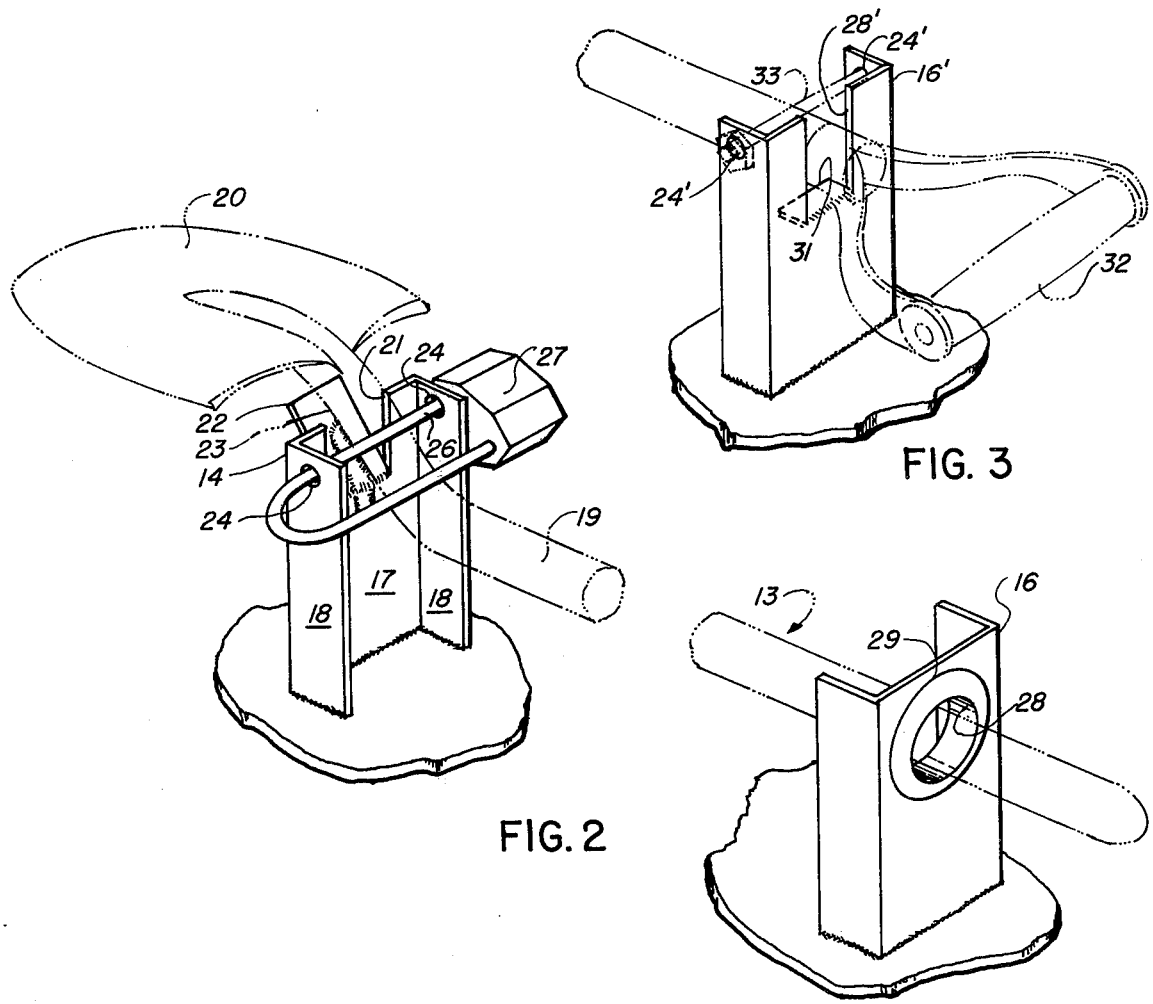
FIG. 3
FIG. 2
FIG. 4

SINGLE SHOVEL HOLDER

BACKGROUND OF THE INVENTION

This invention relates to a device for mounting a hand shovel on a piece of equipment and, more particularly, such a holder which is quite simple and yet securely maintains a shovel in a chosen location on such a piece of equipment.

It is desirable in many industries, such as in the construction or timber industries, to keep a hand shovel generally available around motorized equipment for use when needed. For example, a hand shovel is often needed during excavation of earth by larger equipment for the smaller shoveling operations which do not warrant the use of expensive equipment. Moreover, a forestry employee who makes inspection rounds in a pickup truck, for example, often desires to carry a shovel with him. Because of such needs, many different arrangements have been devised for securing a shovel to a piece of motorized equipment. In general, the holder designs vary greatly depending on the particular piece of equipment or use to which the shovel might be put. Also, most of such designs are relatively complicated.

SUMMARY OF THE INVENTION

The present invention provides a universal holder for securely mounting a single hand shovel in any convenient location on various different kinds of equipment. The holder of the invention provides such versatility while yet being quite simple and inexpensive.

In its basic aspects, the holder comprises a pair of metal channel brackets for the shovel adapted to be permanently secured to the piece of equipment at selected locations spaced from one another. The first one of the brackets is designed to hold the shovel adjacent its scoop end and, to this end, has an open-ended slot extending into its webbing for receiving the handle of such shovel adjacent such scoop end. Means are provided enabling the open end of the slot to be blocked to prevent a shovel from being extracted from the bracket through the open end. The first bracket also includes a block projecting from the webbing into a position at which it will engage the scoop of any shovel in the slot to prevent such shovel from being extracted therefrom by passing the handle of the slot longitudinally through the slot.

The second bracket includes an opening extending through its webbing adapted to receive the handle of the shovel adjacent the free end of the shovel. In one embodiment of the invention, such opening is in the form of a circular aperture through which the free end of the shovel handle can be inserted, which aperture includes a gasket around its perimeter to prevent the shovel handle from contacting the sharp edge of the opening and being damaged. In another embodiment of the invention, the opening in the webbing of the second bracket is an open ended slot for receiving the handle of a shovel adjacent its free end. This latter embodiment is particularly useful when the shovel includes a transverse hand grip at the free end of such shovel.

It should be noted that the holder will work with various spacings between the brackets so that different spacings dictated by different kinds of equipment can be accommodated. Moreover, the channel iron shape of the brackets facilitates their rigid securance to a surface by welding.

The invention includes other features and advantages which will either be discussed or will become apparent from the following more detailed description of the preferred embodiments.

BRIEF DESCRIPTION OF THE DRAWING

With reference to the single sheet of the drawing:

FIG. 1 is a perspective view of a pickup truck illustrating a preferred embodiment of the invention permanently secured thereto and holding a hand shovel;

FIG. 2 is an enlarged isometric view of a preferred embodiment of the holder of the invention, showing the same in some detail and illustrating its relationship to a hand shovel held thereby;

FIG. 3 is an isometric view illustrating the bracket of another preferred embodiment of the invention; and FIG. 4 is a partial side elevation view of a tractor having a preferred embodiment of the invention mounted on the boom of a backhoe.

DESCRIPTION OF PREFERRED EMBODIMENTS

With reference to the drawing, FIG. 1 illustrates a preferred embodiment, generally referred to by the reference numeral 11, of the invention mounted on the back end of a pickup truck 12 to secure a shovel 13 thereon. As best illustrated in FIG. 2, the holder comprises a pair of brackets 14 and 16, each one of which is formed from a piece of U-shaped channel metal, preferably iron. That is, each of the brackets is made up of a thin-walled metal webbing 17, e.g., one-eighth inch thick, connecting a pair of spaced metal flanges 18 which are parallel to one another and orthogonal to the webbing.

The bracket 14 is adapted to securely hold the handle 19 of the shovel 13 adjacent its scoop 20. More particularly, the bracket 14 is provided with a slot 21 which is open at its upper end for receiving such handle. In this connection, while the width of the slot 21 is sufficient to accommodate the width of the shovel handle 19, it is, as shown, less than the width of the scoop 20.

A block projects from the webbing 17 into a position at which it will engage the shovel 13 to prevent the shovel from being extracted from the slot longitudinally. To this end, a tongue 22 projects angularly upward from adjacent the bottom of the slot 21 in a direction which is generally parallel to the direction of the shank 23 of the scoop 20 when the shovel is in engagement with the slot 21 in an upside down relationship as shown. Tongue 22 is simply made by bending the metal from the slot 21 at the bottom of the slot through an angle desired for the tongue, rather than severing it along such bottom.

Means are also provided enabling the open end of the slot to be blocked to prevent the shovel from being extracted from the bracket 14 through such open end. That is, a pair of coaxial apertures 24 extend through the flanges 18 respectively on opposite sides of the slot for receiving the bolt 26 of a padlock 27 or the like as illustrated. In this connection, it should be noted that in those instances in which one is not concerned with potential unauthorized removal of the shovel, a pin or a bolt and nut can be substituted for the padlock 27.

The manner in which the bracket 14 securely holds the scooped end of a shovel should be readily apparent. The padlock 27 or its substitute will prevent the shovel from being extracted through the open end of the slot 21. And, since the width of the slot is less than the width of the scoop 20, the shovel cannot be removed from the bracket 14 by passing the scoop of the shovel longitudinally through the slot. Moreover, the tongue 22 and the bolt 26 of the padlock cooperate to prevent the shovel from being passed longitudinally in the other direction through the slot. More particularly, because of the presence of the tongue 22, the shovel would have to move upward to disengage the scoop shank 23, which upward movement is blocked by the padlock bolt 26.

The free end of the shovel handle 19 is securely held in position by the bracket 16. Bracket 16 is similar to the bracket 14 in that it is also of U-shaped channel metal having a thin-walled webbing 17 connecting a pair of spaced flanges 18. Such bracket 16 further includes an opening 28 extending through the webbing adapted to receive a shovel handle adjacent its free end. In the embodiment of FIG. 2, such opening takes the form of a circular aperture sized to receive the free end of the shovel handle. As shown, such aperture is circumscribed by a gasket 29 of a neoprene rubber or the like to prevent the handle from contacting the bracket metal at the edge of such opening.

In use, the individual brackets 14 and 16 are welded or otherwise permanently secured to the body of the motorized equipment at locations which are spaced from one another with the slot 21 in the bracket 14 axially aligned with the opening 28 in the bracket 16. In this connection, as mentioned before, the distance between the brackets can be varied to accommodate the characteristics of any particular installation. For example, FIG. 4 is included to illustrate a different spacing of the brackets than that shown in FIG. 1 facilitating the securance of a shovel on another piece of equipment, a backhoe.

It should be noted that the channel iron configuration in which the flanges 18 project perpendicularly from the webbing 17 at the base of the brackets facilitates a strong welded securance of the brackets to a piece of equipment. Moreover, if desired, a manufacturer can provide the brackets 14 and 16 with extra length so that each can be cut to a length suitable for a particular installation.

As known, some shovels, such as scoop shovels, have a transverse hand grip supplied at their free end. FIG. 3 illustrates a channel bracket 16' which replaces the bracket 16 when it is such a shovel that is to be securely mounted to a motorized piece of equipment. As illustrated, the opening 28' of the bracket 16' is in the form of an open-ended slot having a width which will accommodate the width of the handle of a shovel of this type, rather than a circular aperture as in the previously described embodiment. Moreover, a support for the handle in the form of a tongue 31 extends transversely from the webbing adjacent the bottom of the slot. In general, there is less concern about a handle of this type of shovel being chafed or marked by the sharp edge of the opening 28' since, as illustrated, the metal shank of the hand grip 32 will protect the wood of the handle. It is for this reason that an edge gasket like the previously mentioned gasket 29 is not provided for this embodiment.

A pair of coaxially aligned apertures 24' are also provided through the respective flanges 18' on opposite sides of the handle slot 28'. The apertures 24' receive the bolt 33 of a bolt and nut combination to selectively block the open end of the slot 28' to prevent the free end of the shovel end from unintentional disengagement with such slot.

It should be noted that the bracket 16' is basically a duplicate of the bracket 14 on the scoop end of the shovel, except that the tongue has been shortened and made generally perpendicular to the webbing. Thus, a manufacturer can easily modify his manufacturing equipment to produce bracket 16' as needed.

The scoop and bracket used with the bracket 16' is the same as the bracket 14 of the earlier described embodiment. It will therefore not be described.

While the invention has been described in connection with preferred embodiments thereof, it will be apparent to those skilled in the art that various changes can be made without departing from the spirit of the invention. It is therefore intended that the coverage afforded applicant be limited only by the claims and their equivalent language.

I claim:

1. A holder for securely mounting a single hand shovel on a piece of equipment comprising:
   A. a pair of channel brackets for said shovel;
   B. a first one of said channel brackets including:
      1. a piece of channel metal having a thin-walled webbing connecting a pair of spaced flanges extending generally orthogonal to said webbing,
      2. an open-ended slot extending into said webbing adapted to receive the handle of a shovel adjacent its scoop end, the width of said slot being less than the width of the scoop of a hand shovel intended to be held thereby,
      3. means enabling the open end of said slot to be blocked to prevent a shovel from being extracted from said bracket through said open end of said slot, and
      4. a block projecting from said webbing into a position at which it will engage the scoop of a shovel in the slot of said webbing to prevent said shovel from being extracted from said slot by passing the handle of said shovel longitudinally through said slot, said block including a tongue projecting angularly upward from adjacent the bottom of said slot in a direction generally parallel to the direction of the shank of the scoop of an upside-down shovel in engagement with said slot;
   C. the second one of said brackets including:
      1. a piece of channel metal having a thin-walled webbing connecting a pair of spaced flanges extending generally orthogonal to said webbing, and
      2. an opening extending through said webbing adapted to receive the handle of said shovel adjacent the free end of said handle; and
   D. said channel brackets being adapted for permanent securance to said piece of equipment at locations spaced from one another with said webbing slot and said webbing opening axially aligned with one another for simultaneous engagement of a single shovel by both of said channel brackets.

2. The single shovel holder of claim 1 wherein said means enabling the open end of said slot to be blocked to prevent the shovel from being extracted from said bracket includes a pair of coaxial apertures extending through said flanges of said channel iron respectively on opposite sides of said slot for receiving a bolt or the like extending across the said open end.

3. The single shovel holder of claim 2 wherein said opening extending through said webbing of said second bracket is a generally circular aperture for receiving the free end of said shovel handle, and a gasket is provided around the perimeter of said opening to prevent said shovel handle from contacting the bracket channel metal at the edge of said opening.

4. The single shovel holder of claim 2 wherein said opening extending through said webbing of said second bracket is an open-ended slot having a width accommodating the width of the handle of a shovel intended to be held thereby adjacent its free end.

5. The single shovel holder of claim 4 further including a pair of coaxial apertures extending through said flanges of said channel respectively on opposite sides of said slot for receiving a bolt or the like extending across said open end.

6. The single shovel holder of claim 4 wherein a support for said free end of said shovel handle extends generally transversely from said webbing of said second bracket adjacent the bottom end of said open-ended slot.

* * * * *